United States Patent
Wilson, III et al.

(10) Patent No.: US 9,475,367 B1
(45) Date of Patent: Oct. 25, 2016

(54) VEHICULAR DOOR ASSEMBLY AND METHODS OF USE AND MANUFACTURE THEREOF

(71) Applicant: Honda Motor Co., Ltd., Tokyo (JP)

(72) Inventors: Robert T. Wilson, III, Marysville, OH (US); Noriyuki Muto, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 87 days.

(21) Appl. No.: 14/695,669

(22) Filed: Apr. 24, 2015

(51) Int. Cl.
  *B60J 5/04* (2006.01)
  *B60J 1/16* (2006.01)
  *B60R 21/06* (2006.01)

(52) U.S. Cl.
  CPC ............ *B60J 5/0468* (2013.01); *B60J 1/16* (2013.01); *B60J 5/0463* (2013.01); *B60J 5/0487* (2013.01); *B60R 21/06* (2013.01)

(58) Field of Classification Search
  CPC ...... B60J 5/0468; B60J 5/0487; B60J 1/085; B60R 21/06
  USPC .................... 296/146.14, 146.2; 280/749
  See application file for complete search history.

(56) References Cited

U.S. PATENT DOCUMENTS

| | | |
|---|---|---|
| 3,037,809 A | 6/1962 | Praha |
| 3,049,373 A | 8/1962 | Biggers |
| 3,692,327 A | 9/1972 | Barrick, Sr. et al. |
| 4,614,058 A | 9/1986 | Boykin |
| 6,183,028 B1 | 2/2001 | Ament et al. |
| 6,186,536 B1 | 2/2001 | Fischer |
| 6,367,536 B1 | 4/2002 | St Louis |
| 6,530,448 B2 | 3/2003 | Abels et al. |
| 6,626,462 B2 | 9/2003 | Saczalski et al. |
| 6,829,952 B2 | 12/2004 | Stanley et al. |
| 7,263,906 B2 | 9/2007 | Kaijala et al. |
| 8,123,279 B2 | 2/2012 | Orr et al. |
| 8,220,862 B2 | 7/2012 | Kaita et al. |
| 8,292,352 B2 | 10/2012 | Furman et al. |
| 8,308,223 B2 | 11/2012 | King |
| 8,465,050 B1 | 6/2013 | Spindler et al. |
| 8,714,591 B1 | 5/2014 | Kobayashi et al. |
| 2012/0032431 A1* | 2/2012 | King ................ B60J 5/0487 280/756 |
| 2013/0199097 A1* | 8/2013 | Spindler ............ B60J 5/047 49/394 |
| 2014/0210234 A1* | 7/2014 | Ricketts ............ B60R 22/24 296/193.03 |

(Continued)

FOREIGN PATENT DOCUMENTS

| | | |
|---|---|---|
| DE | 102010060123 A1 | 4/2012 |
| DE | 102012016180 A1 | 2/2014 |

*Primary Examiner* — Jason S Morrow

(74) *Attorney, Agent, or Firm* — Kenealy Vaidya LLP

(57) ABSTRACT

Some embodiments are directed to a vehicular door assembly that includes a door that is movable between the open and closed positions, and a window panel assembly that includes interior member, a frame member surrounding the interior member, and a plurality of connector assemblies. A interior member mount assembly includes a bracket, a spring guide, and a spring. The bracket includes a base portion rigidly connected to the door, and a flange portion that defines an aperture and that extends at an angle relative to the base portion. The spring guide is movable within the aperture. A first end of the spring is connected to the bracket, and a second end of the spring is connected to the spring guide. The spring guide is connected to one of the plurality of connector assemblies, such that the spring guide is movable within the aperture as the door moves between open and closed positions.

20 Claims, 9 Drawing Sheets

(56) References Cited

U.S. PATENT DOCUMENTS

2014/0306487 A1* 10/2014 Dobrot .................. B60J 5/0487
296/190.03

2015/0021955 A1* 1/2015 Szewczyk ............... B60R 21/06
296/190.03
2015/0175114 A1* 6/2015 Schroeder ............... B60R 21/06
296/190.03

* cited by examiner

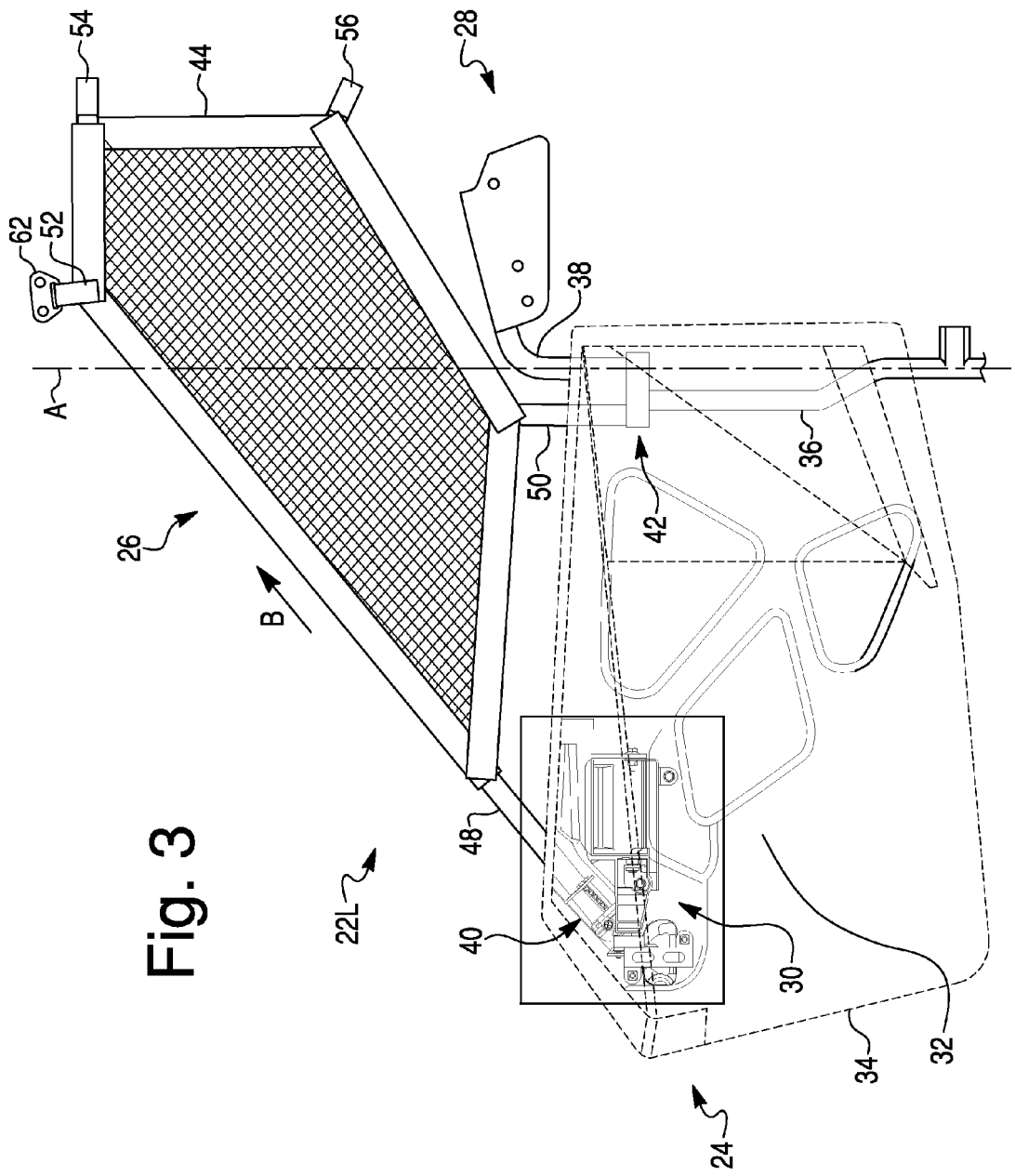

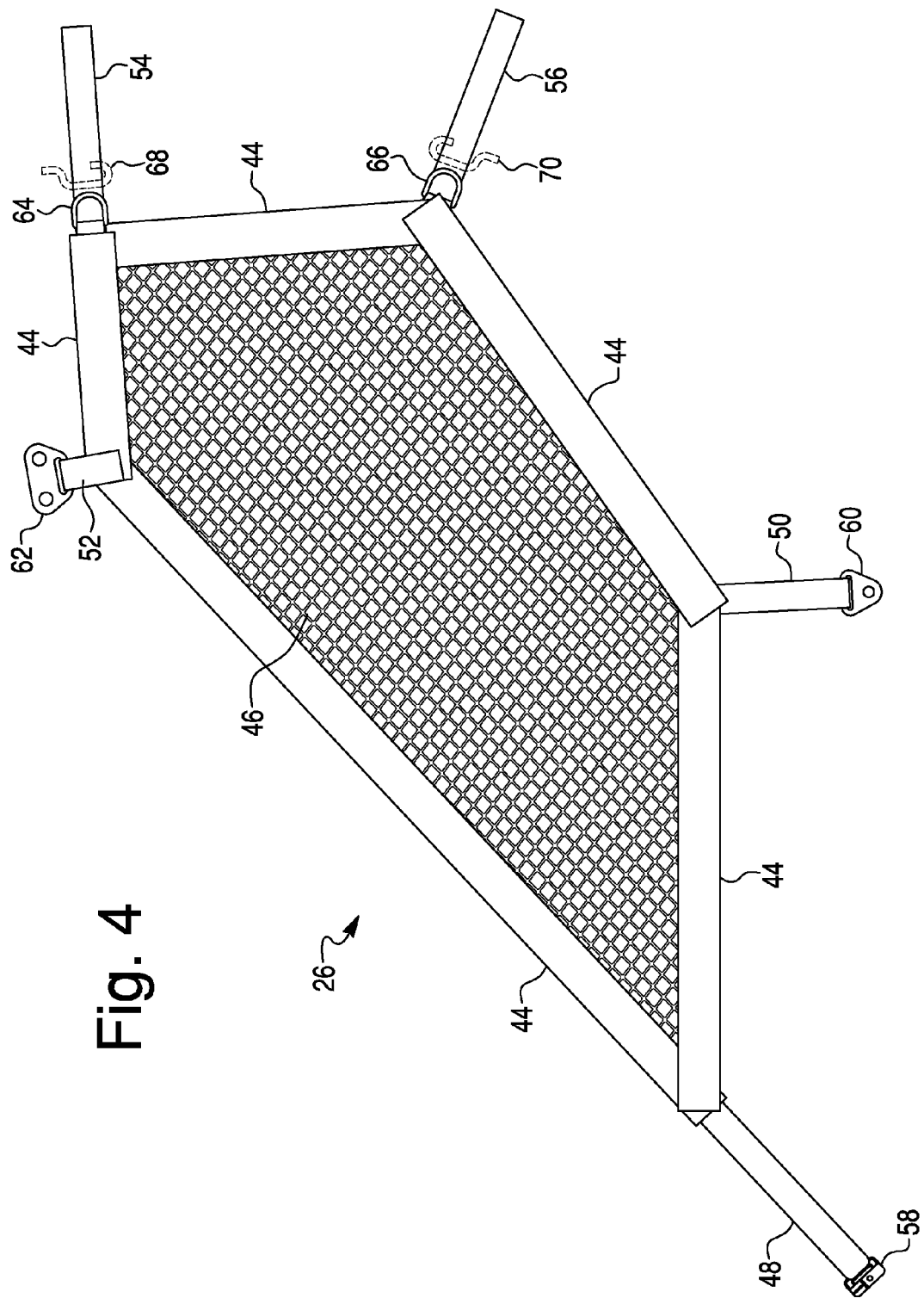

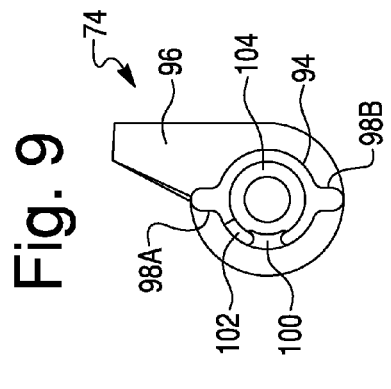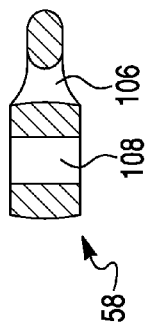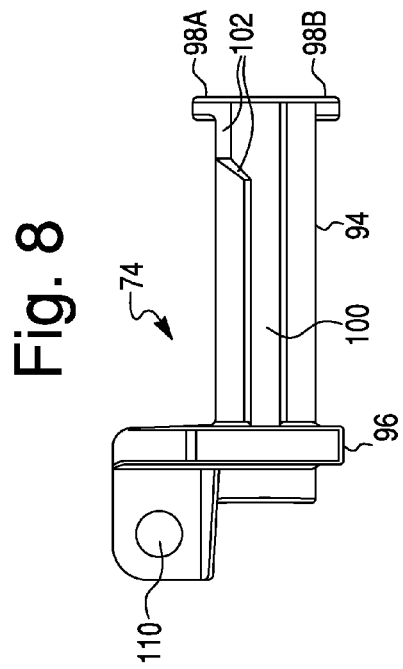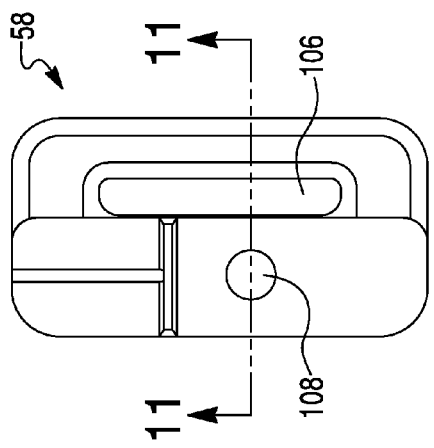

VEHICULAR DOOR ASSEMBLY AND METHODS OF USE AND MANUFACTURE THEREOF

BACKGROUND

The disclosed subject matter relates to vehicular door assemblies, and methods of use and manufacture thereof. More particularly, the disclosed subject matter relates to methods and apparatus for enabling or facilitating movement of vehicular door assemblies, such as between open and closed orientations.

Certain features of many related art self-propelled vehicles can be specially configured based on the path on which they are intended to travel, including: 1) an improved path (such as paths paved with a durable surface material, e.g., asphalt, concrete, stone, brick, etc.), 2) an unimproved path (such as a dirt path), and/or 3) any unmarked path of travel (such as along a wooded area, open field, rocky area, water feature, etc.). For example, many related art "off-road vehicles" can be specially configured to enhance performance while traveling along an unimproved or unmarked path, such as to provide enhanced durability or to facilitate other performance aspects relevant to off-road travel.

This specialized configuration can involve the design of door(s), hatch(es), etc., such as those separating a passenger area from the environment in which the vehicle is operating. These door(s), hatch(es), etc., can include or otherwise involve assemblies of multiple elements, including a vehicular frame and at least one of a fixed window, a movable window, a fixed net, a fully removable net, a partially removable net, a front hinge assembly, a rear hinge assembly, etc.

SUMMARY

Certain of these related art vehicular door(s), hatch(es), etc., may be subject to various disadvantages. As one example, some vehicular doors include a lower door structure and a window panel configured as a net, netting, mesh, transparent or semi-transparent panel, etc. configured to obstruct (partially or completely) an opening defined between the lower door structure and an upper vehicular frame element (such as a portion of a vehicular roll cage). Some of these doors are configured to be movable between open and closed positions to facilitate ingress, egress, etc. of a vehicle passenger. For example, the lower door structure can be rotatably fixed to the vehicle, and in some cases connected to the vehicular frame by a hinge.

However, rotation of the lower door structure creates challenges with regard to the net. For example, rigidly connecting the net to the lower door structure and the upper vehicular frame element may impede door rotation and thus impede opening of the door, especially for window panel configurations that cover a relatively large area above the lower door structure. In other words, opening of the door causes the window panel to stretch (because it is also attached to the upper vehicular frame element) and thereby resist rotation of the lower door structure.

The window panel can be configured to be manually removable (partially or fully) from the lower door assembly and/or upper vehicular frame element. In other words, the window panel can be removed prior to opening the lower door structure, such as to facilitate vehicular passenger ingress or egress, and then reattached upon closing of the lower door structure. However, removing and reattaching the window panel can be inconvenient, inefficient, etc.

Thus, it may be beneficial to provide a door assembly that addresses at least one of the above and/or other disadvantages of the related art, such as by providing a vehicular door assembly that does not impede opening of the door while remaining attached to the lower door structure and upper vehicular frame element. It may also be beneficial to provide such a door assembly that covers a sufficient area between the lower door structure and upper vehicular frame element. It may be further beneficial to provide such a door assembly that enables tension of the window panel to be maintained while the door is in the open configuration and/or closed configuration.

Some embodiments are therefore directed to a vehicular door assembly that is movable between an open position that can provide a door opening enabling passenger ingress and egress to a vehicular passenger compartment, and a closed position that can at least partially obstruct the door opening and thereby can impede such ingress and egress, the door opening can be bounded at an upper end by an upper vehicular frame member. The vehicular door assembly can include a door that is movable between the open and closed positions, and a net assembly that can include an interior member, a frame member surrounding the interior member, and a plurality of connector assemblies that can facilitate connection of the frame member to the door and to the upper vehicular frame member. The vehicular door assembly can also include a window mount assembly that can include a bracket, a spring guide, and a spring. The bracket can include a base portion rigidly connected to the door, and a flange portion that can define an aperture and that can extend at an angle relative to the base portion. The spring guide can be movable within the aperture. A first end of the spring can be connected to the bracket, and a second end of the spring can be connected to the spring guide. The spring guide is connected to one of the plurality of connector assemblies, such that the spring guide can be movable within the aperture as the door moves between open and closed positions.

Some other embodiments are directed to a window mount assembly for use with a vehicular door assembly that can be movable between an open position that can provide a door opening enabling passenger ingress and egress to a vehicular passenger compartment, and a closed position that can at least partially obstruct the door opening and thereby can impede such ingress and egress. The door opening can be bounded at an upper end by an upper vehicular frame member. The vehicular door assembly also can include a door that is movable between the open and closed positions, and a window panel assembly that can include an interior member, a frame member surrounding the interior member, and a plurality of connector assemblies that can facilitate connection of the frame member to the door and to the upper vehicular frame member. The window mount assembly can include a bracket including a base portion configured to be rigidly connected to the door, and a flange portion that can define an aperture and that extends at an angle relative to the base portion. A spring guide can be movable within the aperture. The spring guide can be configured to be connected to one of the plurality of connector assemblies, such that the spring guide is movable within the aperture as the door moves between the open and closed positions. A spring can have first and second ends, the first end of the spring can be connected to the bracket, and the second end of the spring can be connected to the spring guide.

Still other embodiments are directed to a method of manufacturing a vehicular door assembly that is movable between an open position that provides a door opening enabling passenger ingress and egress to a vehicular passenger compartment, and a closed position that at least partially obstructs the door opening and thereby impedes such ingress and egress, the door opening being bounded at an upper end by an upper vehicular frame member. The method of manufacturing can include: surrounding at least one of a mesh interior member and a transparent interior member with a frame member; facilitating connection of the frame member to a door and to the upper vehicular frame member with a plurality of connector assemblies, the door being movable between the open and closed positions; rigidly connecting a base portion of a bracket to the door; forming an aperture in a flange portion of the bracket, the flange extending at an angle relative to the base portion; disposing a spring within a spring guide such that the spring guide is movable within the aperture; connecting a first end of the spring to the bracket; connecting a second end of the spring to the spring guide; and connecting the spring guide to one of the plurality of connector assemblies, such that the spring guide is movable within the aperture as the door moves between open and closed positions.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 3 is a side view of the door assembly of FIGS. 1 and 2.

FIG. 4 is a side view of a window panel assembly of the door assembly of FIG. 3.

FIG. 8 is a side view of a spring guide of the door assembly of FIG. 3.

FIG. 9 is an end view of the spring guide of the door assembly of FIG. 3.

FIG. 10 is a side view of a connection member of the door assembly of FIG. 3.

FIG. 11 is a cross-section view taken along line 11-11 of FIG. 10.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overall Vehicle

Figure 1:
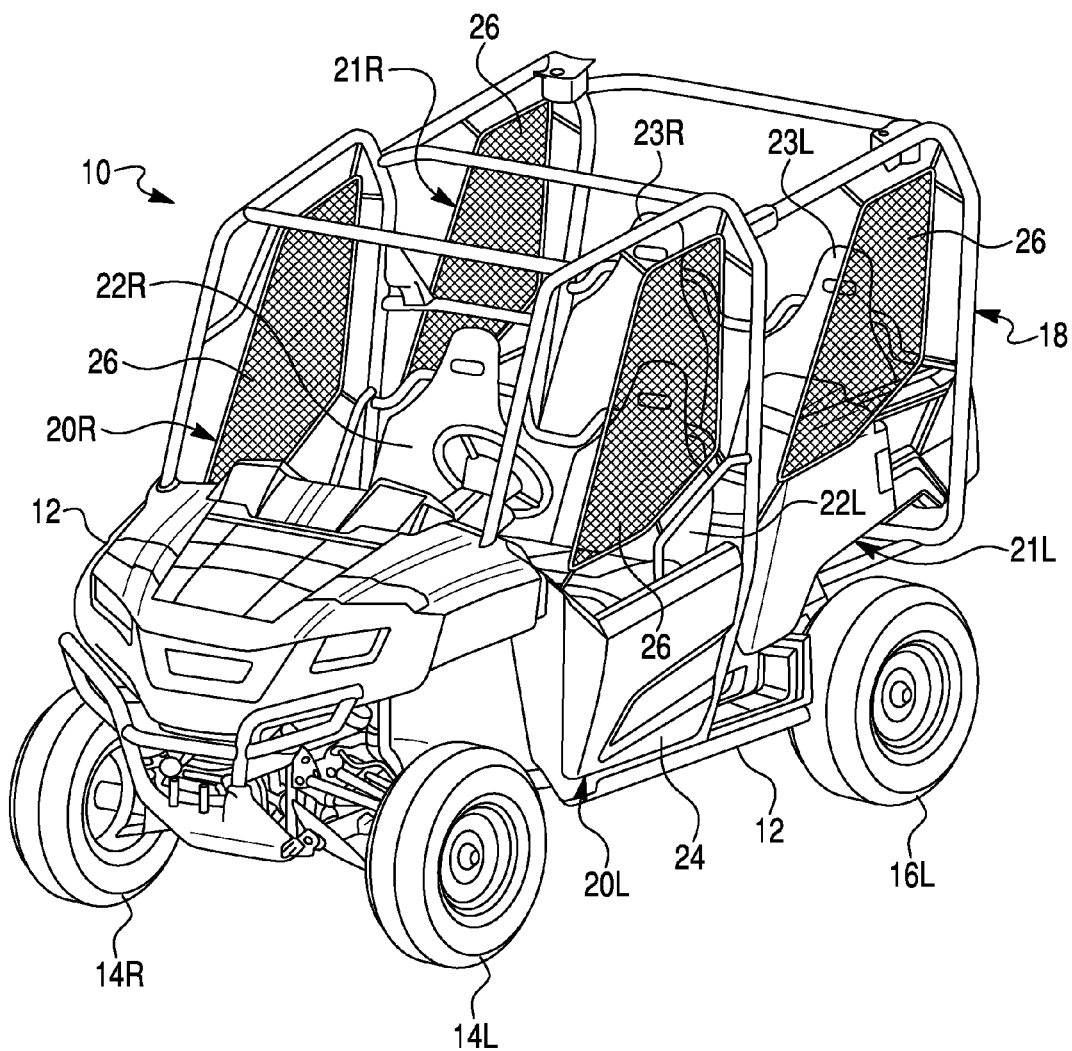
FIG. 1 is a perspective view of a first exemplary vehicle including a door assembly in accordance with the disclosed subject matter.
Figure 2:
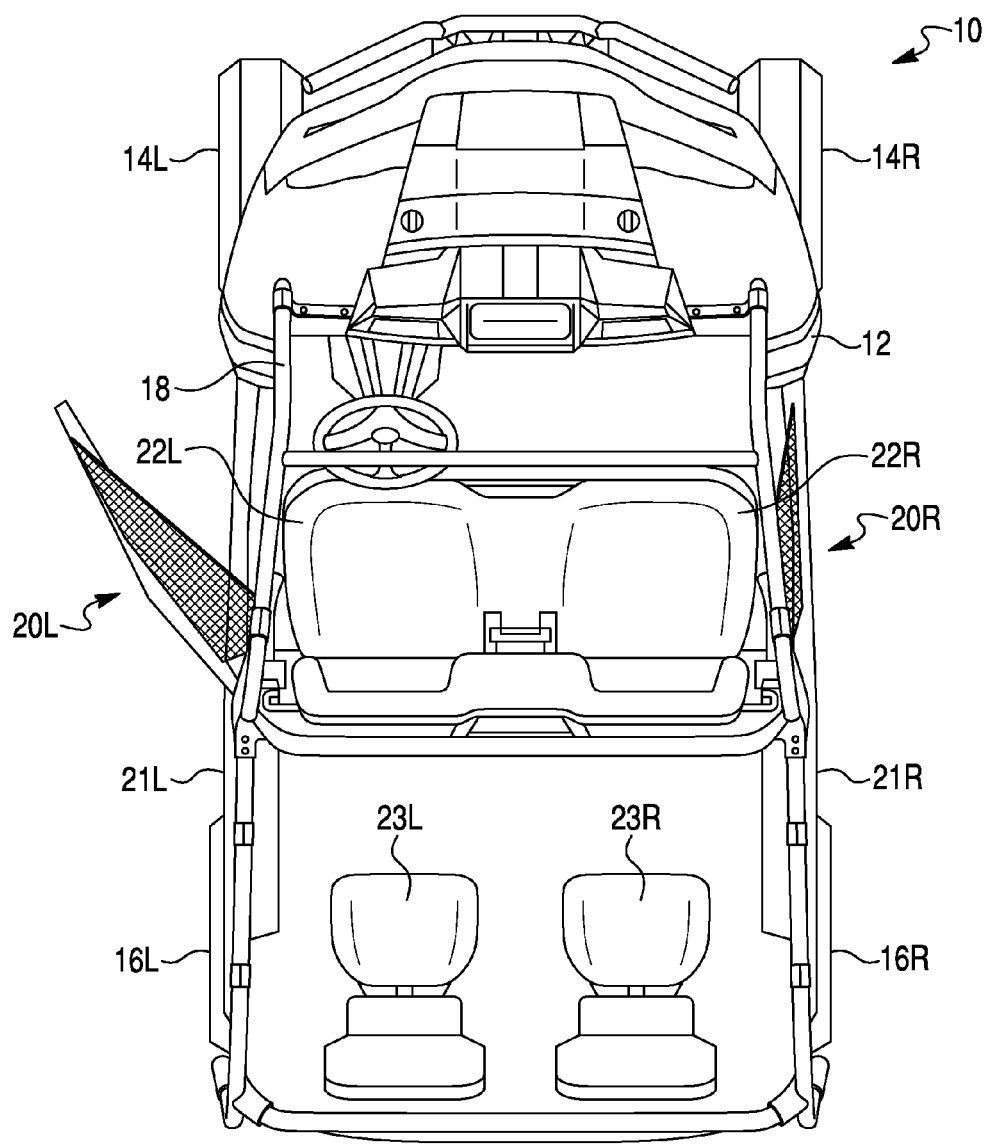
FIG. 2 is a top view of the vehicle and door assembly of FIG. 1 showing the door assembly in an open position.

FIGS. 1 and 2 are a perspective view and a top view, respectively, of a first exemplary vehicle 10 in accordance with the disclosed subject matter. The exemplary vehicle 10 of FIGS. 1 and 2 is configured for travel along any one or combination of improved, unimproved, and unmarked paths. The vehicle 10 can be specialized for use on an unimproved path or on an unmarked path, and be referred to as a multipurpose utility vehicle (MUV) or as a side-by-side all-terrain vehicle (SxS, or SxS ATV).

The vehicle 10 can include a body 12, a pair of front wheels, 14L, 14R, a pair of rear wheels 16L, 16R (the right-side rear wheel 16R is obstructed from view in FIG. 1 and is shown in FIG. 2), a roll cage 18, a pair of front door assemblies 20L, 20R, a pair of rear door assemblies 21L, 21R, a frame assembly, and a powertrain. The frame assembly is hidden from view in FIG. 1 by the body, and the powertrain is omitted from FIG. 1 for simplicity and clarity of the drawing.

The vehicle 10 can include a pair of front seats 22L, 22R and a pair of rear seats 23L, 23R mounted in a passenger area of the vehicle 10. The roll cage 18 can be configured to extend around and above the seats 22L, 22R, 23L, 23R and the passenger area. The roll cage 18 can cooperate with the body 12 and/or at least a portion of the frame assembly to define a pair of door openings through which a passenger may pass in order to enter or exit the passenger area.

The door assemblies 20L, 20R, 21L, 21R can be configured to selectively open and close access through the door openings by moving between a closed position and a fully opened position. In the closed position, the door assemblies 20L, 20R, 21L, 21R can span the respective door openings to obstruct access to the passenger area via the door openings. In the closed position, the front portion of the door assembly 20L, 20R, 21L, 21R can be latched to the roll cage 18. The fully opened position can be any position where the door assemblies 20L, 20R, 21L, 21R are pivoted away from the respective door openings to provide substantially unobstructed access to the passenger area via the door openings. FIG. 1 shows the door assemblies 20L, 20R, 21L, 21R in the closed position. FIG. 2 shows the left-side front door assembly 20L in a fully opened position and the remaining door assemblies 20R, 21L, 21R in the closed position.

II. Door Assembly

FIG. 3 shows an exemplary embodiment of the left-side front door assembly 20L. The right-side door assembly 20R can be the same as, i.e., mirror image of, the left-side door assembly 20L. The rear door assemblies 21L, 21R can be configured with similar structure as the front door assemblies 20L, 20R but with a different overall aesthetic appearance and geometry. Each door assembly 20L, 20R, 21L, 21R can include a door 24, window panel assembly 26, hinge assembly 28, and handle and latch assembly 30.

Each door assembly 20L, 20R, 21L, 21R can be configured as a rear-hinged door assembly. The window panel assembly 26 can be connected to the door and the roll cage 18 in any appropriate manner that can permit the door 24 and window panel assembly 26 to pivot as a unit between open and closed positions, such as adjacent a rear edge of the door 24. This configuration obviates disconnecting the window panel assembly 26 from either or both of the door 24 and the roll cage 18 during ingress and egress with the passenger area, thereby simplifying such ingress and egress. Further details of the connection between the window panel assembly 26 and the each of the door 24 and the roll cage 18 will be discussed below.

As shown in FIG. 3, the door 24 can include an inner door panel 32 and an outer door panel 34 connected to the inner door panel 32 in any appropriate manner, such as but not limited to mechanical fastener(s), adhesive, welding, interference fit, snap-fit, etc. At least a portion of the hinge assembly 28 and at least a portion of the handle and latch assembly 30 can be housed between the door panels 32, 34. The inner door panel 32 can be configured to provide enhanced strength and/or rigidity to the door 24. The outer door panel 34 can be configured to provide an aesthetic appearance for the exterior surface of the door 24.

Figure 14:
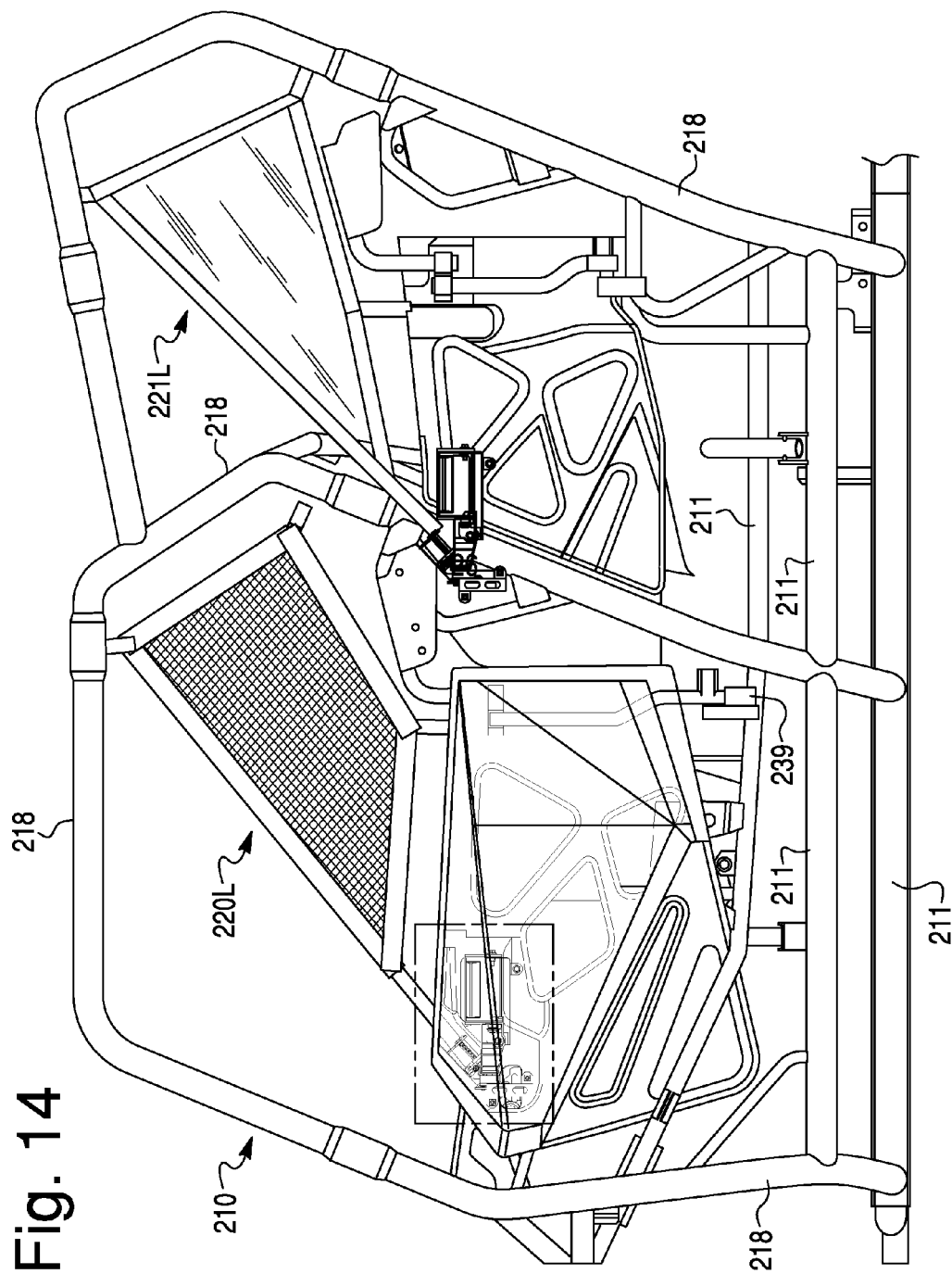
FIG. 14 is a side view of a portion of a partially assembled second exemplary vehicle in accordance with the disclosed subject matter.

The hinge assembly 28 can include a hinge post 36, an upper door mount 38 and a lower door mount (omitted for clarity and simplicity of FIG. 3—see, for example, lower door mount 239 in FIG. 14). The hinge post 36 can be connected to one or both of the door panels 32, 34. An upper end of the hinge post 36 can be rotatably connected to the upper door mount 38, and a lower end of the hinge post 36 can be rotatably connected to the lower door mount. The upper door mount 38 and lower door mount can be rigidly connected to the frame and/or the roll cage 18 in any appropriate manner, such as but not limited to mechanical fastener(s), adhesive, welding, etc.

III. Window Panel Assembly

As shown in FIGS. 3 and 4, the window panel assembly 26 can include a frame member 44, an interior member 46, and a plurality of connector assemblies.

The frame member 44 can be formed from any appropriate known, related art or later developed material, such as a flexible material including but not limited to polyester, nylon, etc. The frame member 44 can be configured from individual strips that can be connected together in any appropriate manner, such as but not limited to sewing, adhesive, mechanical fastener(s), etc.

The window panel assembly 26 can be configured using a variety of materials, including a net assembly and/or a transparent panel assembly. FIGS. 1-4 illustrate the exemplary window panel assembly 26 configured as a net. FIG. 14 illustrates a front left-side door assembly 220L that can include a window panel assembly configured as a net and a rear left-side door assembly 221L that can include a window panel assembly configured as a transparent panel assembly.

If the window panel assembly 26 is configured as a net assembly, the interior member 46 can be configured as a mesh formed from a plurality of criss-crossing and spaced apart strips, wires, threads, etc., or formed by making holes in a solid sheet of material. The mesh interior member 46 can be formed from any appropriate known, related art or later developed material, such as but not limited to polyester, nylon, etc. The mesh interior member 46 can be formed by any appropriate process, such as but not limited to molding, weaving, etc. The openings of the mesh interior member 46 can be formed with any appropriate geometry, such as but not limited to polygonal, circular, etc. The openings of the mesh interior member 46 can have any dimension(s) appropriate for the desired performance of the window panel assembly 26 configured as a net. The mesh interior member 46 can be secured to and surrounded by the frame member 44 in any appropriate manner, such as but not limited to sewing, adhesive, crimping, etc. In an exemplary embodiment, each individual strip of the frame 44 can be folded, the mesh interior member 46 can be inserted into the folded strips, and each half of each folded strip can be sewn together, thereby sandwiching the mesh interior member 46 in each folded strip of the frame 44.

If the window panel assembly 26 is configured as a transparent panel assembly, interior member 46 can be configured as a transparent or semi-transparent pane. The interior member 46 can be solid or can include one or more holes to achieve desired performance. The interior member 46 also can be flexible so that the window panel assembly 26 can be rolled or folded, as needed. However, exemplary embodiments are intended to include a transparent pane interior member 46 that is rigid to the extent that the pane interior member 46 will not move with respect to itself during normal operation of the vehicle, and cannot be rolled or folded without the use of a tool. The interior member 46 can be formed from any appropriate material such as but not limited to polyvinylchloride, methyl methacrylate (a.k.a., acrylic glass), other vinyls, glasses, metal foils, etc., and can include various films thereon such as one-way mirrored films, paints, etc.

The plurality of connector assemblies can be configured as any appropriate device or assembly, such as but not limited to mechanical fasteners, tethers, etc., that can removably or non-removably connect the window panel assembly 26 to the door 24 and the roll cage 18. In the exemplary embodiment, the plurality of connector assemblies can include a plurality of tether straps 48, 50, 52, 54, 56, a plurality of connector members 58, 60, 62, and a plurality of D-ring pairs 64, 66. However, exemplary embodiments are intended to cover a plurality of connector assemblies that include a plurality of string pairs configured to be tied around the roll cage 18 or a portion of the door 24; a plurality of straps configured to wrap around the roll cage 18 or a portion of the door 24 and provided with one of a snap fastener, buckle fastener, hook, and loop type fastener.

Each of the tether straps 48, 50, 52, 54, 56 can be spaced about the perimeter of the frame member 44. Each of the tether straps 48, 50, 52, 54, 56 can include a first end connected to the frame member 44 in any appropriate manner, such as but not limited to sewing, adhesive, mechanical fastener(s), etc. Each of the tether straps 48, 50, 52, 54, 56 can include a second free end spaced beyond the perimeter of the frame member 44. In other words, each of the tether straps 48, 50, 52, 54, 56 can extend away from the frame member 44. Each of the tether straps 48, 50, 52, 54, 56 can be formed from any appropriate material, such as but not limited to polyester, nylon, etc., that can permit the tether straps 48, 50, 52, 54, 56 to wrap around the roll cage 18.

A first connector member 58 can be connected to the second end of the first tether 48 in any appropriate manner. The first connector member 58 can be configured to connect the first tether strap 48 to the door 24. Details of the first connector member 58 will be discussed below with reference to FIGS. 10-13.

The second window mount assembly 42 can include a second connector member 60 and a receiving portion. The receiving portion can be formed on the upper door mount 38. The second connector member 60 can be connected to the second end of the second tether strap 50 in any appropriate manner. In the exemplary embodiment of FIG. 4, the second connector member 60 can include a substantially flat body, an elongated slot, and a hole. The elongated slot can be configured to receive a portion of the second tether strap 50. The second free end of the second tether strap 50 can pass through the elongated slot, be folded back onto a portion of the second tether strap 50, and be secured to this portion in any appropriate manner, such as but not limited to sewing, adhesive, or mechanical fastener(s). The second connector member 60 can be connected to the receiving portion of the upper door mount 38 in any appropriate manner, such as but not limited to a mechanical fastener, mating mechanical structure, adhesive, welding, etc. Exemplary embodiments are intended to include the hole formed in the second connector member 60 that can be configured to receive a mechanical fastener, such as but not limited to a pin, bolt, screw, rivet, etc. Exemplary embodiments are intended to include a configuration wherein the second connector member is connected to any other appropriate portion of the door 24, such as but not limited to the inner door panel 32, outer door panel 34, and top edge of the door 24.

A third connector member 62 can be connected to the second end of the third tether strap 52 in any appropriate manner. In the exemplary embodiment of FIG. 4, the third connector member 62 can include a substantially flat body, elongated slot, and pair of holes. The elongated slot can be configured to receive a portion of the third tether strap 50. The second free end of the third tether strap 52 can pass through the elongated slot, be folded back onto a portion of the third tether strap 52, and be secured to this portion in any appropriate manner, such as but not limited to sewing, adhesive, or mechanical fastener(s). The third connector member 62 can be connected to the roll cage in any appropriate manner, such as but not limited to a mechanical fastener, mating mechanical structure, adhesive, welding, etc. Exemplary embodiments are intended to include a mounting hole formed in the second connector member 60 that can be configured to receive a mechanical fastener, such as but not limited to a pin, bolt, screw, rivet, etc. Exemplary embodiments are intended to include a configuration where the second connector member is connected to any other appropriate portion of the door 24, such as but not limited to the inner door panel 32, outer door panel 34, and top edge of the door 24.

A first pair of D-rings 64 can be connected to the frame member 44 in any appropriate manner, such as but not limited to a mounting loop formed in the fourth tether strap 54. The first one of the pair of D-rings 64 obscures from view (in the perspective of FIG. 4) the second one of the pair of D-rings 64. The fourth tether strap 54 can be wrapped around a portion of the roll cage 18 and threaded through the first pair of D-rings 64 to hold the fourth tether strap 54 taught.

A second pair of D-rings 66 can be connected to the frame member 44 in any appropriate manner, such as but not limited to a mounting loop formed in the fifth tether strap 56. The first one of the pair of D-rings 66 obscures from view (in the perspective of FIG. 4) the second one of the pair of D-rings 66. The fifth tether strap 56 can be wrapped around a portion of the roll cage 18 and threaded through the second pair of D-rings 66 to hold the fifth tether strap 56 taught.

As shown in phantom in FIG. 4, first and second hooks 68, 70 can be mounted to the roll cage 18 to support the fourth and fifth tether straps 54, 56 in the desired position on the roll cage 18.

Referring to FIGS. 1-4, desired performance of the window panel assembly 26 can cause the location for the connection of the third tether strap 52 to the roll cage 18 to be misaligned with the hinge axis A of the hinge assembly 28. Due to this misalignment, the first tether strap 48 can be urged to move away from the door 24 in the direction of arrow B of FIG. 3, if the door assembly 20L moves from the closed position toward the fully opened position.

If the window panel assembly 26 is in a taught state with each door assembly 20L, 20R, 21L, 21R in the closed position, and the window panel assembly 26 is rigidly connected to the door 24, then an elastic deformation limit of the window panel assembly 26 can operate to limit movement of each door assembly 20L, 20R, 21L, 21R to only a partially open position. In other words, the elasticity of the window panel assembly 26 can be less than a stroke distance, where the stroke distance can be the distance between: 1) the position of the first connector member 58 if the door assemblies 20L, 20R, 21L, 21R are in the closed position, and 2) the location of the first connector member 58 if the door assemblies 20L, 20R, 21L, 21R are in the opened position. This partially opened position can delineate a range of motion that can be less than the range of motion delineated by the fully opened position.

The window panel assembly 26 could be dimensioned to be in a slacked state when the door assemblies 20L, 20R, 21L, 21R are in the closed position so as to not impede the door assemblies 20L, 20R, 21L, 21R from reaching the fully opened position. In other words, if the window panel assembly 26 is designed with an excess length from the third tether strap 52 to the first tether strap 48, then the window panel assembly 26 would be in a slacked state when the door assemblies are in the closed position. However, this slacked state of the window panel assembly 26 can reduce its performance when the door is in the closed position, such as by not fully spanning the desired opening above the door panels 32, 34.

Further, aligning the connection location of the third tether strap 52 to the roll cage 18 so that it aligns with the pivot axis of the hinge assembly 28 can reduce the performance of the window panel assembly 26.

The first window mount assembly 40 can permit relative motion between the window panel assembly 26 and the door 24 in order to compensate for the stroke length, while maintaining the window panel assembly 26 in a taught state if the door assemblies 20L, 20R, 21L, 21R move to any position between and including the closed position and the fully opened position. Thus, the first window mount assembly 40 can facilitate enhanced performance for the window panel assembly 26 and an advantageous range of the motion for the door assemblies 20L, 20R, 21L, 21R.

IV. First Mount Assembly

FIGS. 5-13 illustrate exemplary features of the first window mount assembly 40. The first window mount assembly 40 can include the first connector member 58, a bracket 72, a spring guide 74 and a spring 76. The bracket 72 can connected to the inner door panel 32 in any appropriate manner, such as but not limited to mechanical fasteners, adhesive, welding, etc. The first connector member 58 can be connected to the spring guide 74 in any appropriate manner, such as but not limited to mechanical fasteners, adhesive, welding, etc. The bracket 72 can support and guide the first connector member 58 and the spring guide 74 as the first connector member 58 and the spring guide 74 move relative to the bracket 72 between first and second positions. A first end of the spring 76 can be supported by the bracket 72, and a second end of the spring 76 can be supported by the spring guide 74. The spring guide 74 can contain or house at least a portion of the spring 76 as the spring guide 74 moves between the first and second positions.

Figure 7:
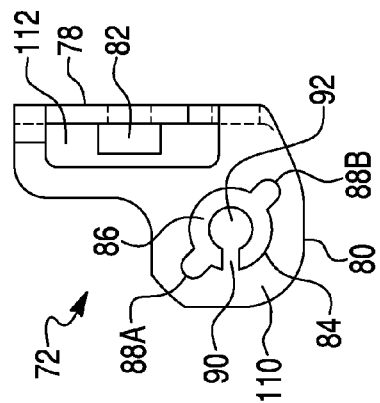
FIG. 7 is an end view of the bracket of the door assembly of FIG. 3.
Figure 5:
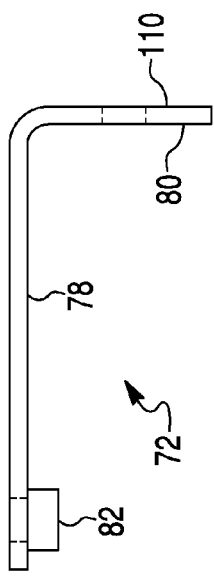
FIG. 5 is a top view of a bracket of the door assembly of FIG. 3.
Figure 6:
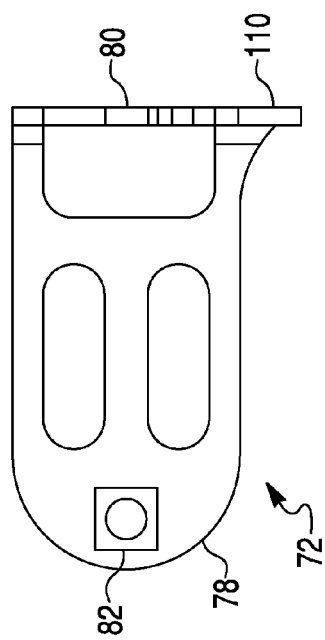
FIG. 6 is a side view of the bracket of the door assembly of FIG. 3.

Referring to FIGS. 5-7, the bracket 72 can include a base portion 78, a flange portion 80, a fastener member 82 and an aperture 84. The bracket 72 can be formed from any appropriate material, such as but not limited to metals, plastics, carbon fiber, ceramics, etc. The bracket 72 can be formed by any appropriate process, such as stamping, CNC milling, laser cutting, cutting with a water jet, molding, sintering, autoclaving, etc., or any combination of these exemplary processes. Exemplary embodiments are intended to include a bracket 72 stamped and/or machined from a steel blank or steel sheet.

The base portion 78 can abut the inner surface of the inner door panel 32. The fastener member 82 can be configured as a threaded weld nut attached adjacent to a first end of the base portion 78. As shown in the exemplary embodiment of FIGS. 12 and 13, a bolt can be threaded through the fastener member 82 to connect the base portion 78 of the bracket 72 to the inner door panel 32.

The flange portion 80 can extend from a second end of the base portion 78 that is spaced from and opposite to the first end of the base portion 78. The flange portion 80 can extend substantially perpendicular to the base portion 78. The flange portion 80 can extend from the same face of the base portion 78 that includes the fastener member 82.

The aperture 84 can extend through the flange portion 80. The aperture 84 can include a substantially C-shaped slot 86 and a pair of keyway portions 88A, 88B. As will be discussed in detail below, the spring guide 74 can be configured to engage the perimeter of the slot 86, and can pass through the slot 86 as the spring guide 74 moves between the first and second positions. Thus, the bracket 72 can support and guide the first connector member 58 and the spring guide 74 as the first connector member 58 and the spring guide 74 move between the first and second positions. The C-shaped slot 86 can define a stem portion 90 and a head portion 92.

As shown in FIGS. 8, 9, 12 and 13, the spring guide 74 can include a main body portion 94, a mounting portion 96 and a pair of arm portions 98A, 98B. The arm portions 98A, 98B can be connected to and extend from a first end of the main body portion 94. The mounting portion 96 can be connected to and extend from a second end of the main body portion 94 opposite the first end. The spring guide 74 can be formed as a single homogenous unit from any appropriate material, such as but not limited to plastics, metals, ceramics, carbon fiber, etc. The spring guide 74 can be formed by any appropriate process, such as but not limited to molding, extruding, sintering, autoclaving, etc. Exemplary embodiments are intended to cover a spring guide 74 formed from a plurality of sub-components that can be connected together in any appropriate manner, such as but not limited to mechanical fasteners, adhesive, welding, interference fitting, etc. Exemplary embodiments are intended to cover a spring guide 74 made by injection molding a polyoxymethylene material.

The main body portion 94 can be hollow and substantially cylindrical in shape. The main body portion 94 can include an elongated slot 100 and a cut-out portion 102. The elongated slot 100 can extend from the first end of the main body portion 94 to the second end. The elongated slot 100 can be centered between the arm portions 98A, 98B. The cut-out portion 102 can extend a certain distance from the first end of the main body portion 94 toward the second end. The length of the elongated slot 100 can be any appropriate length that can permit the desired range of motion of the door assemblies 20L, 20R, 21L, 21R to include the desired fully opened position.

The spring 76 can be housed within the hollow interior of the main body portion 94. The spring 76 can be configured as a coil spring. A first end of the spring 76 can abut an end surface 104 of the spring guide 74. The end surface 104 can be annular in shape with a centered opening. The second end of the spring 76 can abut the stem portion 90 of the bracket 72. As viewed in FIGS. 12 and 13, the spring 76 can be compressed between the end surface 104 of the spring guide 74 and the stem portion 90 of the bracket 72, as the spring guide 74 and the first connector member 58 move relative to the bracket 72 from the first position (shown in FIG. 12) to the second position (shown in FIG. 13).

Assembly of the spring guide 74 to the bracket 72 will be described with reference to FIGS. 7-9. With the spring 76 received in the hollow interior of the main body portion 94, the spring guide 74 can be aligned with the aperture 84 in the flange portion 80 of the bracket 72, so that the first arm portion 98A aligns with the first keyway portion 88A, and the second arm portion 98B aligns with the second keyway portion 88B. In this alignment, the stem portion 90 of the bracket 72 can align with the cut-out portion 102 of the spring guide 74. Then, the stem 90 can be received by the cut-out portion 102 as the arm portions 98A, 98B pass through the respective keyway portions 88A, 88B. If the arm portions 98A, 98B pass through to the other side of the respective keyway portions 98A, 98B, then the spring guide 74 or the bracket 72 can be rotated so that the arm portions 98A, 98B are misaligned with the keyways 88A, 88B and the stem 90 is aligned with the elongated slot 100. The bias force exerted by the spring 76 can cause the arm portions 98A, 98B of the spring guide 74 to engage the end face 110 of the bracket 72.

FIGS. 10 and 11 show an exemplary embodiment of the first connector member 58. The first connector member 58 can have a substantially rectangular shape. The first connector member 58 can be made from any appropriate material, such as but not limited to plastics, metals, ceramics, carbon fibers, etc. The first connector member 58 can be formed by any appropriate process, such as molding, stamping, extruding, sintering, autoclaving, etc. Exemplary embodiments are intended to cover a first connector member 58 injection molded from polypropylene. The connector member 58 can include an elongated slot 106 and a mounting hole 108.

The first tether strap 48 can be connected to the first connector member 58 by threading the free end of the first tether strap 48 through the elongated slot 106, and folding the free end of the first tether strap 48 back onto the first tether strap 48. The folded free end can be secured to the first tether strap 48 and sewn onto the first tether strap 48. Thus, the first connector member 58 can be secured to a loop formed adjacent to the free end of the first tether strap 48.

The mounting hole 108 of the first connector member 58 can be aligned with a mounting hole formed in the end face 110 of the mounting portion 96 of the spring guide 74, and then secured by any appropriate mechanical fastener, such as but not limited to a nut and bolt, pin and cotter pin, rivet, screw, etc. Thus, the spring housing 74 can move in unison with the first connector member 58.

After securing the first tether strap 48 to the first connector member 58, and connecting the spring guide 74 to the bracket 72, the first connector member 58 can be passed through an opening formed between the flange portion 80 and the base portion 78 of the bracket 72. Then, the first connector member 58 can be secured to the mounting portion 96 of the spring guide 74 as described above.

Figure 12:
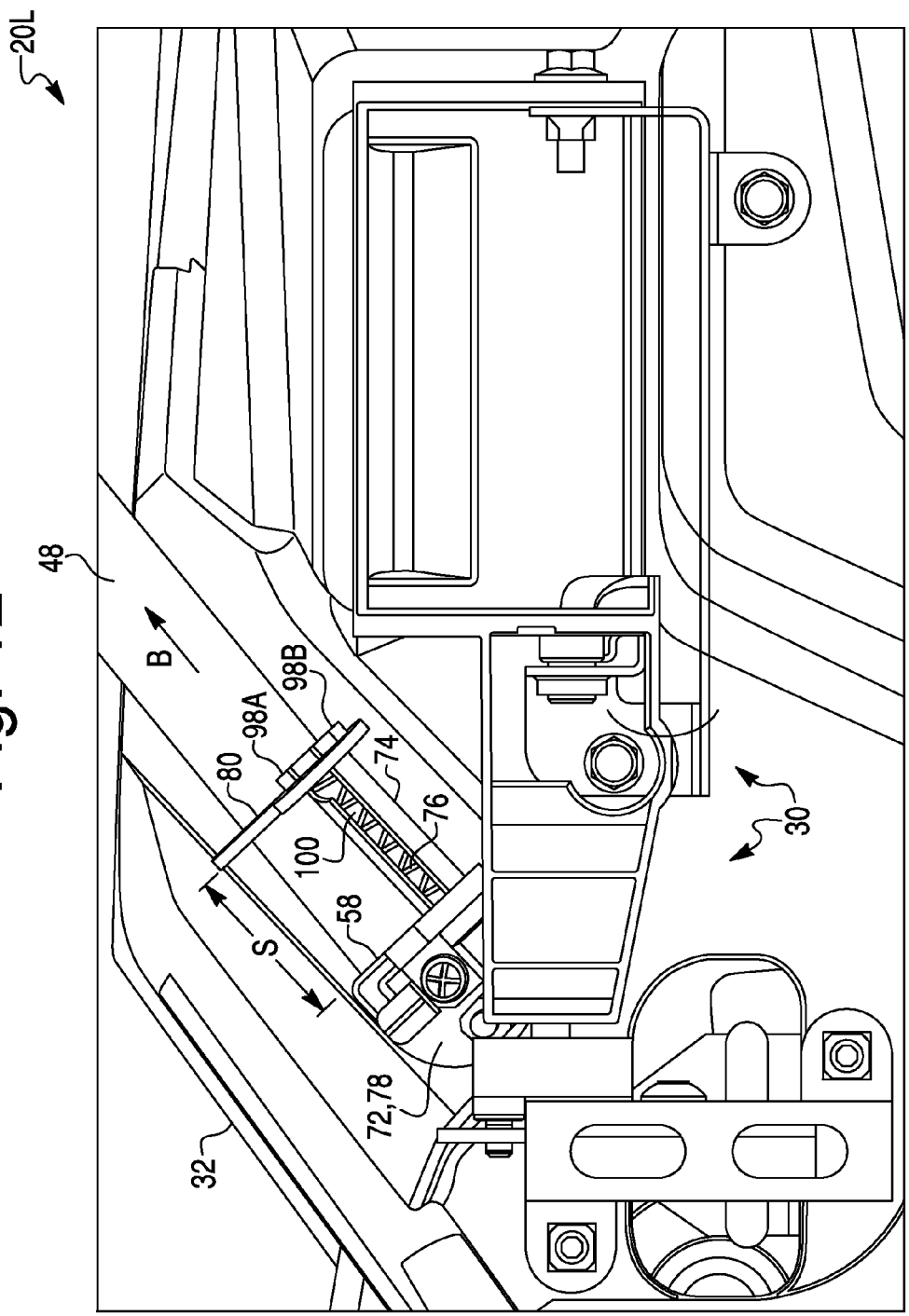
FIG. 12 is an enlarged view of a portion of FIG. 3 with the door assembly in a closed position.
Figure 13:
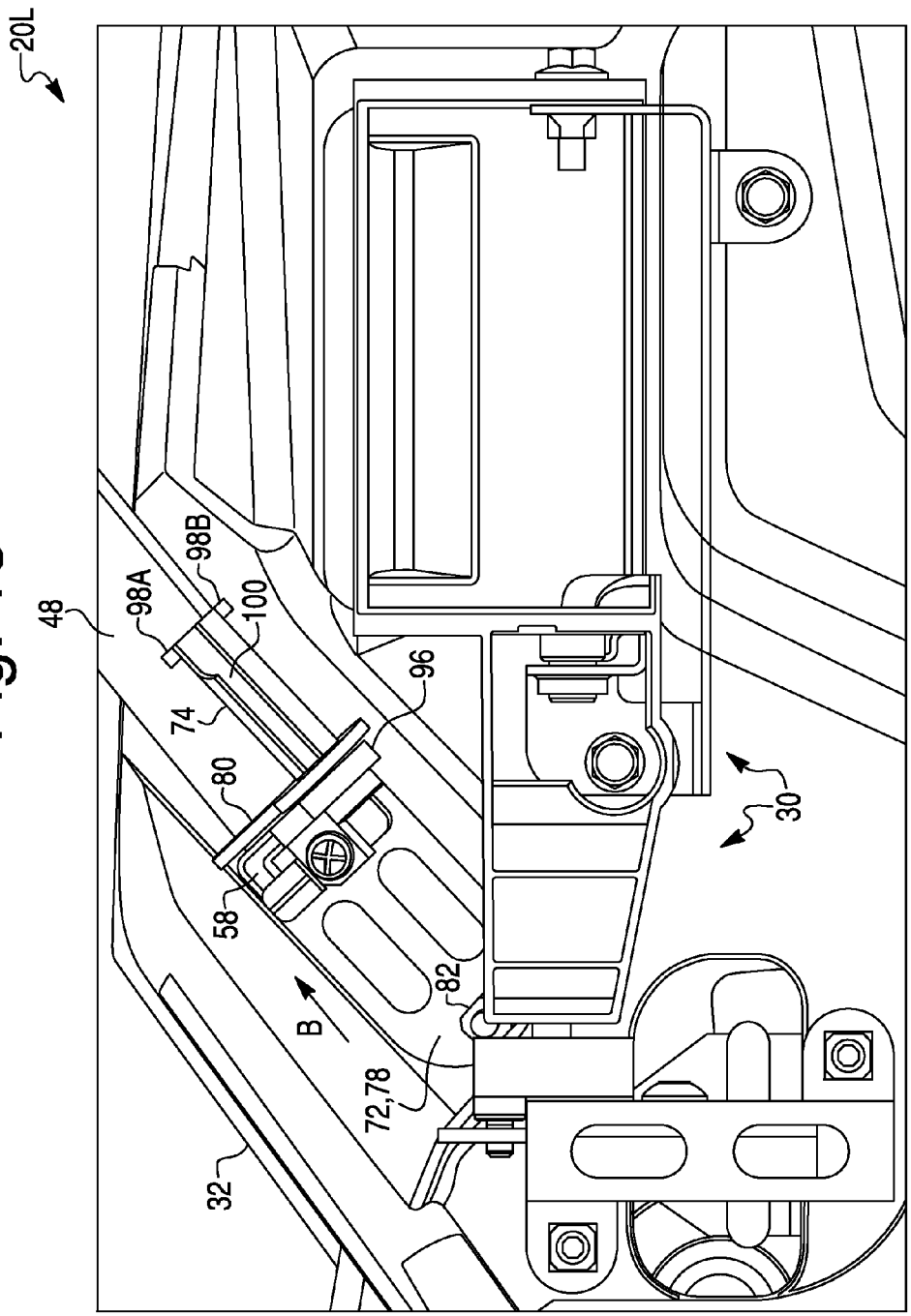
FIG. 13 is an enlarged view of a portion of FIG. 3 with the door assembly in the in an open position.

Operation of the first window mount assembly 40 will be described with reference to FIGS. 12 and 13. FIG. 12 shows the position of the various exemplary components of the first window mount assembly 40 if the door assembly 20L is in the closed position. FIG. 13 shows the position of the various exemplary components of the first window mount assembly 40 if the door assembly 20L is in an opened position.

As discussed above, the first window mount assembly 40 can compensate for any restriction placed on the range of motion for the door assemblies 20L, 20R by the connection between the third tether strap 52 and the roll cage 18. In other words, the first window mount assembly 40 can permit the first connector member 58 to move through a stroke distance S as the door assemblies 20L, 20R move between the closed position and the fully opened position. As disclosed above, the length of the elongated slot 100 can be dimensioned provide the stroke distance S.

If the door assemblies 20L, 20R, 21L, 21R are in the closed position, then the first connector member 58 can be in the position shown in FIG. 12. Here, the first connector member 58 can be spaced from the flange portion 80 of the bracket 72 by a stroke distance S.

If the door assemblies 20L, 20R, 21L, 21R are in the fully opened position, then the first connector member 58 can be in the position shown in FIG. 13. Here, the first connector member 58 can engage the flange portion 80 of the bracket 72. Thus, the first window mount assembly 40 can permit a portion of the window panel assembly 26 to move relative to the door 24 through the stroke distance S in the direction of arrow B.

If the door assemblies 20L, 20R, 21L, 21R are in the closed position, then the bias force exerted by the spring 76 can urge the first connector member 58 away from the flange portion 80 of the bracket 72, and can urge the arm portions 98A, 98B into engagement with the end face 110 on the flange portion 80 of the bracket 72. In other words, the spring 72 can cause the first connector member 58 to move through the stroke distance S in a direction opposite to the direction of arrow B. Thus, if the door assemblies 20L, 20R, 21L, 21R are in the closed position, then the spring 76 can compensate for the stroke length S while maintaining the window panel assembly 26 in a taught state.

Thus, the first window mount assembly 40 can permit relative displacement of a connection between the window panel assembly 26 and the door 24 so that the door assemblies 20L, 20R, 21L, 21R can reach the desired fully opened position. Additionally, the first window mount assembly 40 can maintain the window panel assembly 26 in a taught state as the door assemblies move between the closed position and the fully opened position.

V. Second Exemplary Vehicle

FIG. 14 illustrates a portion of a second exemplary vehicle 210 in a partially assembled state and in accordance with the disclosed subject matter.

The exemplary vehicle 210 of FIG. 14 is configured for travel along any one or combination of improved, unimproved, and unmarked paths. The vehicle 210 can be specialized for use on an unimproved path or on an unmarked path, and referred to as a multipurpose utility vehicle (MUV) or as a side-by-side all-terrain vehicle (S×S, or S×S ATV).

The vehicle 210 can include a body, a pair of front wheels, a pair of rear wheels, a roll cage 218, a pair of front door assemblies (the left-side front door assembly 220L obstructs the view of the right-side front door assembly), a pair of rear door assemblies (the left-side rear door assembly 221L obstructs the view of the right-side rear door assembly), a frame assembly 211, and a powertrain. The body, wheels, seats and powertrain are omitted from FIG. 14 for clarity and simplicity of the drawing.

The roll cage 218 can be configured to extend around and above the seats and the passenger areas. The roll cage 218 can cooperate with the body and/or at least a portion of the frame assembly 211 to define a pair of front door openings and a pair of rear door openings through which a passenger may pass in order to enter or leave the passenger area.

The left-side door assemblies 220L, 221L (and the right-side door assemblies) can be configured as described above with respect to FIGS. 1-13. As an exemplary embodiment, the front left-side door assembly 220L can include a widow panel assembly 26 configured as a net assembly and the rear left-side door assembly 221L can include a window panel assembly 26 configured as a transparent panel assembly. In other words, the front left-side door assembly 220L can include a mesh interior member and the rear left-side door assembly 221L can include a transparent pane interior member. However, exemplary embodiments are intended to cover a front left-side door assembly 220L that can include a transparent pane interior member and the rear left-side door assembly 221L that can include a mesh interior member, and any combinations thereof. Exemplary embodiments also include each of the left-side and right-side door assemblies including a net assembly or each of the left-side and right-side door assemblies including a transparent panel assembly. Operation of the left-side door assemblies 220L, 221L (and the right-side door assemblies) can be as described above with respect to FIGS. 1-13.

VI. Alternative Embodiments

While certain embodiments of the invention are described above, and FIGS. 1-14 disclose the best mode for practicing the various inventive aspects, it should be understood that the invention can be embodied and configured in many different ways without departing from the spirit and scope of the invention.

The vehicle 10 of FIGS. 1-13 and the vehicle 210 of FIG. 14 have a pair of both front and rear doors. However, embodiments are intended to include or otherwise cover vehicles having any number of doors, including any odd or even number of doors. In fact, various of the features and elements disclosed above can be applied in contexts other than doors. For example, various of the inventive aspects can be applied in the context of any assembly or element that is rotatably movable, such as a vehicular rear hatch, etc. Still further, various of the inventive aspects can be applied to structures that are unrelated to vehicles.

The vehicle 10 of FIGS. 1-13 and the vehicle 210 of FIG. 14 have four seats arranged in two rows. However, embodiments are intended to include or otherwise cover vehicles having any number of seats all arranged in a row, or all arranged in tandem, or arranged in any number of rows. Embodiments are intended to include or otherwise cover a single seat for each vehicle occupant, or a single seat for a plurality of vehicle occupants (also referred to as a bench seat).

Some of the embodiments disclosed above utilize a spring, such as spring 76, as a tensioning device. However, embodiments are intended to include or otherwise cover any other known, related art, or later developed apparatus or structure for performing this tensioning.

The power source can be an internal combustion engine, an electric motor, or a hybrid of an internal combustion engine and an electric motor. The power source configured as an internal combustion engine or a hybrid power source can have the engine output axis oriented in the longitudinal direction L or in the traverse direction T of the vehicle. The engine can be mounted forward of the front axles, rearward of the rear axles, or intermediate the front and rear axles.

A vehicular transmission can be used that an automatic transmission, a manual transmission, or a semi-automatic transmission. The transmission can include an input shaft, an output shaft, and a speed ratio assembly.

Embodiments are also intended to include or otherwise cover methods of using and methods of manufacturing any or all of the elements disclosed above. The methods of manufacturing include or otherwise cover processors and computer programs implemented by processors used to design various elements of the adjustable arm rest mechanism disclosed above.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A vehicular door assembly that is movable between an open position that provides a door opening enabling passenger ingress and egress to a vehicular passenger compartment, and a closed position that at least partially obstructs the door opening and thereby impedes such ingress and egress, the door opening being bounded at an upper end by an upper vehicular frame member, the vehicular door assembly comprising:
   a door that is movable between the open and closed positions;
   a window panel assembly that includes an interior member, a frame member surrounding the interior member, and a plurality of connector assemblies that facilitate connection of the frame member to the door and to the upper vehicular frame member; and
   a window mount assembly that includes a bracket, a spring guide, and a spring, the bracket including a base portion rigidly connected to the door and a flange portion that defines an aperture and that extends at an angle relative to the base portion, the spring guide being movable within the aperture, a first end of the spring being connected to the bracket and a second end of the spring being connected to the spring guide, the spring guide being connected to one of the plurality of connector assemblies such that the spring guide is movable within the aperture as the door moves between open and closed positions.

2. The vehicular door assembly according to claim 1, wherein the plurality of connector assemblies include a first connector connected to the spring guide and a second connector connected to the upper vehicular frame member at a mounting location, and the door pivots about a hinge axis that is offset from the mounting location.

3. The vehicular door assembly according to claim 1, wherein the plurality of connector assemblies include a first connector that is movable through a stroke distance as the door moves between the open and closed positions.

4. The vehicular door assembly according to claim 1, wherein the plurality of connector assemblies include a tether connected to the frame member.

5. The vehicular door assembly according to claim 1, wherein the upper vehicular frame member defines a portion of a vehicular roll cage, and the door includes a door panel.

6. The vehicular door assembly according to claim 1, further including a hinge assembly that includes a hinge post, an upper door mount, and a lower door mount, an upper end of the hinge post being connected to the upper door mount, a lower end of the hinge post being connected to the lower door mount, the hinge post being connected to the door panel, the upper and lower door mounts being rigidly connected to the vehicular roll cage.

7. The vehicular door assembly according to claim 1, wherein the plurality of connector assemblies include at least one of a plurality of tether straps, a plurality of connector members, and a plurality of D-ring pairs.

8. The vehicular door assembly according to claim 1, wherein the aperture includes a substantially C-shaped slot and a pair of keyway portions, the C-shaped slot defining a stem portion and a head portion, the spring guide being configured to engage a perimeter of the C-shaped slot and to pass through the slot as the spring guide moves between first and second positions.

9. The vehicular door assembly according to claim 1, wherein the spring guide includes a main body portion, a mounting portion, and a pair of arm portions, the arm portions being connected to and extending from a first end of the main body portion, the mounting portion being connected to and extending from a second end of the main body portion that is opposite to the first end.

10. The vehicular door assembly according to claim 9, wherein the main body portion of the spring guide is hollow and substantially cylindrical, and defines an elongated slot and a cut-out portion, the elongated slot extending from the first end of the main body portion to the second end, the elongated lot being centered between the pair of arm portions.

11. The vehicular door assembly according to claim 10, wherein the spring is disposed within the hollow interior of the main body portion of the spring guide, and the spring is a coil spring.

12. The vehicular door assembly according to claim 1, wherein the interior member is configured as at least one of a mesh interior member and a transparent pane interior member.

13. A window mount assembly for use with a vehicular door assembly that is movable between an open position that provides a door opening enabling passenger ingress and egress to a vehicular passenger compartment, and a closed position that at least partially obstructs the door opening and thereby impedes such ingress and egress, the door opening being bounded at an upper end by an upper vehicular frame member, the vehicular door assembly also including a door that is movable between the open and closed positions, and a window panel assembly that includes an interior member, a frame member surrounding the interior member, and a plurality of connector assemblies that facilitate connection of the frame member to the door and to the upper vehicular frame member, the window mount assembly comprising:
   a bracket including a base portion configured to be rigidly connected to the door and a flange portion that defines an aperture and that extends at an angle relative to the base portion;
   a spring guide that is movable within the aperture, the spring guide being configured to be connected to one of the plurality of connector assemblies such that the spring guide is movable within the aperture as the door moves between the open and closed positions; and a spring having first and second ends, the first end of the spring being connected to the bracket, and the second end of the spring being connected to the spring guide.

14. The window mount assembly according to claim 13, wherein the plurality of connector assemblies include a first connector that is movable through a stroke distance as the door moves between the open and closed positions.

15. The window mount assembly according to claim 13, wherein the interior member is configured as at least one of a mesh interior member and a transparent pane interior member.

16. The window mount assembly according to claim 13, wherein the aperture includes a substantially C-shaped slot and a pair of keyway portions, the C-shaped slot defining a stem portion and a head portion, the spring guide being configured to engage a perimeter of the C-shaped slot and to pass through the slot as the spring guide moves between first and second positions.

17. The window mount assembly according to claim 13, wherein the spring guide includes a main body portion, a mounting portion, and a pair of arm portions, the arm portions being connected to and extending from a first end of the main body portion, the mounting portion being connected to and extending from a second end of the main body portion that is opposite to the first end.

18. The window mount assembly according to claim 17, wherein the mounting portion of the spring guide is configured to be connected to the one of the plurality of connector assemblies.

19. The window mount assembly according to claim 17, wherein the main body portion of the spring guide is hollow and substantially cylindrical, and defines an elongated slot and a cut-out portion, the elongated slot extending from the first end of the main body portion to the second end, the elongated lot being centered between the pair of arm portions.

20. A method of manufacturing a vehicular door assembly that is movable between an open position that provides a door opening enabling passenger ingress and egress to a vehicular passenger compartment, and a closed position that at least partially obstructs the door opening and thereby impedes such ingress and egress, the door opening being bounded at an upper end by an upper vehicular frame member, the method of manufacturing comprising:
   surrounding at least one of a mesh interior member and a transparent pane interior member with a frame member;
   facilitating connection of the frame member to a door and to the upper vehicular frame member with a plurality of connector assemblies, the door being movable between the open and closed positions;
   rigidly connecting a base portion of a bracket to the door;
   forming an aperture in a flange portion of the bracket, the flange extending at an angle relative to the base portion;
   disposing a spring within a spring guide such that the spring guide is movable within the aperture;
   connecting a first end of the spring to the bracket;
   connecting a second end of the spring to the spring guide; and
   connecting the spring guide to one of the plurality of connector assemblies, such that the spring guide is movable within the aperture as the door moves between open and closed positions.

* * * * *